United States Patent
Erell et al.

(10) Patent No.: US 8,611,448 B2
(45) Date of Patent: Dec. 17, 2013

(54) CODEBOOK ADAPTATION IN MIMO COMMUNICATION SYSTEMS USING MULTILEVEL CODEBOOKS

(75) Inventors: Adoram Erell, Herzliya (IL); Daniel Yellin, Ra'anana (IL)

(73) Assignee: Marvell World Trade Ltd., St. Michael (BB)

( * ) Notice: Subject to any disclaimer, the term of this patent is extended or adjusted under 35 U.S.C. 154(b) by 38 days.

(21) Appl. No.: 13/023,555

(22) Filed: Feb. 9, 2011

(65) Prior Publication Data

US 2011/0194638 A1 Aug. 11, 2011

Related U.S. Application Data

(60) Provisional application No. 61/303,217, filed on Feb. 10, 2010, provisional application No. 61/329,798, filed on Apr. 30, 2010.

(51) Int. Cl.
*H04L 1/02* (2006.01)
(52) U.S. Cl.
USPC .......................... 375/267; 375/295; 375/219
(58) Field of Classification Search
USPC .................... 375/267, 295, 240, 219
See application file for complete search history.

(56) References Cited

U.S. PATENT DOCUMENTS

| | | | |
|---|---|---|---|
| 5,231,629 A | 7/1993 | Kotzin et al. | |
| 5,349,567 A | 9/1994 | Reed | |
| 5,940,439 A | 8/1999 | Kleider et al. | |
| 6,466,904 B1 | 10/2002 | Gao et al. | |
| 6,512,750 B1 | 1/2003 | Palenius | |
| 6,757,319 B1 | 6/2004 | Parsa et al. | |
| 6,865,237 B1 | 3/2005 | Boariu et al. | |
| 7,649,831 B2 * | 1/2010 | Van Rensburg et al. | 370/203 |
| 7,839,944 B2 | 11/2010 | Lee et al. | |
| 7,912,141 B2 * | 3/2011 | She et al. | 375/267 |

(Continued)

FOREIGN PATENT DOCUMENTS

| | | |
|---|---|---|
| EP | 2182754 A1 | 5/2010 |
| JP | 2008147792 A | 6/2008 |

(Continued)

OTHER PUBLICATIONS

3rd Generation Partnership Project; Technical Specification Group Radio Access Network; Requirements for Further Advancements for Evolved Universal Terrestrial Radio Access (E-UTRA) (LTE-Advanced) (Release 8), 3GPP TR 36.913 V8.0.1, Sophia Antipolis, France, Mar. 2009.

(Continued)

*Primary Examiner* — Daniel Washburn
*Assistant Examiner* — Berhanu Tadese

(57) ABSTRACT

A method includes holding in a receiver a definition of a codebook including precoding matrices, and a definition of multiple sub-codebooks including different respective subsets of the precoding matrices in the codebook. A sub-codebook is selected in coordination with a transmitter, for use in a given time interval or frequency range. A Multiple-Input Multiple-Output (MIMO) signal that is transmitted from the transmitter is received. Feedback is generated in the receiver based on the received MIMO signal. The feedback is indicative of one or more preferred precoding matrices, which are chosen from the selected sub-codebook and which are to be used in precoding subsequent MIMO signals in respective partitions of the given time interval or frequency range. The feedback is transmitted from the receiver to the transmitter.

18 Claims, 3 Drawing Sheets

(56) References Cited

U.S. PATENT DOCUMENTS

| | | | |
|---|---|---|---|
| 7,941,186 B2 | 5/2011 | Cho et al. | |
| 8,036,286 B2 | 10/2011 | Lee et al. | |
| 8,068,555 B2 | 11/2011 | Jongren et al. | |
| 8,098,750 B2 | 1/2012 | Mueck et al. | |
| 8,179,775 B2 | 5/2012 | Chen et al. | |
| 8,325,844 B2 | 12/2012 | Walton et al. | |
| 2003/0035491 A1 | 2/2003 | Walton et al. | |
| 2005/0141630 A1 | 6/2005 | Catreux et al. | |
| 2005/0157810 A1 | 7/2005 | Raleigh et al. | |
| 2005/0237920 A1 | 10/2005 | Howard et al. | |
| 2005/0250544 A1 | 11/2005 | Grant et al. | |
| 2006/0014554 A1 | 1/2006 | Gerlach | |
| 2006/0056538 A1 | 3/2006 | Nam et al. | |
| 2006/0093060 A1 | 5/2006 | Jung et al. | |
| 2006/0114858 A1 | 6/2006 | Walton et al. | |
| 2006/0153112 A1 | 7/2006 | Lim et al. | |
| 2006/0203777 A1 | 9/2006 | Kim et al. | |
| 2006/0233131 A1 | 10/2006 | Gore et al. | |
| 2006/0276212 A1 | 12/2006 | Sampath et al. | |
| 2007/0058746 A1 | 3/2007 | Gueguen | |
| 2007/0076810 A1 | 4/2007 | Herrera et al. | |
| 2007/0099578 A1 | 5/2007 | Adeney et al. | |
| 2007/0149229 A1 | 6/2007 | Frederiksen et al. | |
| 2007/0153731 A1 | 7/2007 | Fine | |
| 2007/0160162 A1 | 7/2007 | Kim et al. | |
| 2007/0165738 A1* | 7/2007 | Barriac et al. | 375/267 |
| 2007/0223422 A1 | 9/2007 | Kim et al. | |
| 2007/0223423 A1 | 9/2007 | Kim et al. | |
| 2007/0230373 A1 | 10/2007 | Li et al. | |
| 2007/0253386 A1 | 11/2007 | Li et al. | |
| 2007/0270170 A1 | 11/2007 | Yoon et al. | |
| 2008/0013610 A1 | 1/2008 | Varadarajan et al. | |
| 2008/0025336 A1 | 1/2008 | Cho et al. | |
| 2008/0039067 A1 | 2/2008 | Jin et al. | |
| 2008/0080364 A1 | 4/2008 | Barak et al. | |
| 2008/0080632 A1 | 4/2008 | Kim et al. | |
| 2008/0080634 A1 | 4/2008 | Kotecha et al. | |
| 2008/0080635 A1 | 4/2008 | Hugl et al. | |
| 2008/0080637 A1 | 4/2008 | Khan et al. | |
| 2008/0095258 A1* | 4/2008 | She et al. | 375/262 |
| 2008/0101407 A1 | 5/2008 | Khan et al. | |
| 2008/0108310 A1 | 5/2008 | Tong et al. | |
| 2008/0112351 A1* | 5/2008 | Surineni et al. | 370/312 |
| 2008/0130778 A1 | 6/2008 | Xia et al. | |
| 2008/0144522 A1 | 6/2008 | Chang et al. | |
| 2008/0165875 A1 | 7/2008 | Mundarath et al. | |
| 2008/0192852 A1 | 8/2008 | Kent et al. | |
| 2008/0198776 A1 | 8/2008 | Seo | |
| 2008/0232494 A1 | 9/2008 | Pan et al. | |
| 2008/0232503 A1 | 9/2008 | Kim | |
| 2008/0247364 A1 | 10/2008 | Kim et al. | |
| 2008/0247475 A1 | 10/2008 | Kim et al. | |
| 2008/0268855 A1 | 10/2008 | Hanuni et al. | |
| 2008/0268887 A1 | 10/2008 | Jansen et al. | |
| 2008/0285433 A1 | 11/2008 | Akita et al. | |
| 2008/0292013 A1 | 11/2008 | Varadarajan et al. | |
| 2008/0298452 A1 | 12/2008 | Sampath et al. | |
| 2008/0298482 A1* | 12/2008 | Rensburg et al. | 375/260 |
| 2008/0318606 A1 | 12/2008 | Tsutsui et al. | |
| 2009/0011761 A1 | 1/2009 | Han et al. | |
| 2009/0016263 A1 | 1/2009 | Kishigami et al. | |
| 2009/0046800 A1 | 2/2009 | Xu et al. | |
| 2009/0098876 A1 | 4/2009 | Khan et al. | |
| 2009/0110114 A1 | 4/2009 | Onggosanusi et al. | |
| 2009/0122857 A1 | 5/2009 | Li et al. | |
| 2009/0161605 A1 | 6/2009 | Shen et al. | |
| 2009/0180561 A1 | 7/2009 | Kim et al. | |
| 2009/0252333 A1 | 10/2009 | Chang et al. | |
| 2009/0282310 A1 | 11/2009 | Seok et al. | |
| 2009/0296844 A1 | 12/2009 | Ihm et al. | |
| 2009/0304109 A1 | 12/2009 | Kotecha | |
| 2010/0031117 A1 | 2/2010 | Lee et al. | |
| 2010/0034308 A1 | 2/2010 | Kim et al. | |
| 2010/0035627 A1 | 2/2010 | Hou et al. | |
| 2010/0054354 A1 | 3/2010 | Tosato | |
| 2010/0056170 A1 | 3/2010 | Lindoff et al. | |
| 2010/0061477 A1 | 3/2010 | Lee et al. | |
| 2010/0067512 A1 | 3/2010 | Nam et al. | |
| 2010/0069106 A1 | 3/2010 | Swarts et al. | |
| 2010/0074301 A1 | 3/2010 | Howard et al. | |
| 2010/0103834 A1 | 4/2010 | Gorokhov et al. | |
| 2010/0158151 A1 | 6/2010 | Krauss et al. | |
| 2010/0172424 A1 | 7/2010 | Perets et al. | |
| 2010/0172430 A1 | 7/2010 | Melzer et al. | |
| 2010/0173639 A1 | 7/2010 | Li et al. | |
| 2010/0215112 A1 | 8/2010 | Tsai et al. | |
| 2010/0220800 A1 | 9/2010 | Erell et al. | |
| 2010/0238984 A1 | 9/2010 | Sayana et al. | |
| 2010/0254474 A1 | 10/2010 | Gomadam et al. | |
| 2010/0260234 A1* | 10/2010 | Thomas et al. | 375/141 |
| 2010/0260243 A1 | 10/2010 | Ihm et al. | |
| 2010/0267341 A1 | 10/2010 | Bergel et al. | |
| 2010/0271968 A1 | 10/2010 | Liu et al. | |
| 2010/0273514 A1 | 10/2010 | Koo et al. | |
| 2010/0278278 A1 | 11/2010 | Lee et al. | |
| 2010/0284484 A1 | 11/2010 | Jongren et al. | |
| 2010/0290548 A1 | 11/2010 | Hoshino et al. | |
| 2010/0296603 A1 | 11/2010 | Lee et al. | |
| 2011/0019631 A1 | 1/2011 | Kotecha et al. | |
| 2011/0026413 A1 | 2/2011 | Swarts et al. | |
| 2011/0034175 A1 | 2/2011 | Fong et al. | |
| 2011/0058621 A1* | 3/2011 | Clerckx et al. | 375/267 |
| 2011/0064156 A1* | 3/2011 | Kim et al. | 375/267 |
| 2011/0077038 A1 | 3/2011 | Montojo et al. | |
| 2011/0080969 A1 | 4/2011 | Jongren et al. | |
| 2011/0085610 A1 | 4/2011 | Zhuang et al. | |
| 2011/0103534 A1 | 5/2011 | Axmon et al. | |
| 2011/0110403 A1 | 5/2011 | Jongren | |
| 2011/0164701 A1* | 7/2011 | Nikopourdeilami et al. | 375/295 |
| 2011/0170435 A1 | 7/2011 | Kim et al. | |
| 2011/0188393 A1 | 8/2011 | Mallik et al. | |
| 2011/0194594 A1 | 8/2011 | Noh et al. | |
| 2011/0194644 A1* | 8/2011 | Liu et al. | 375/295 |
| 2011/0205930 A1 | 8/2011 | Rahman et al. | |
| 2011/0235608 A1 | 9/2011 | Koo et al. | |
| 2011/0250919 A1 | 10/2011 | Barbieri et al. | |
| 2011/0268204 A1 | 11/2011 | Choi et al. | |
| 2011/0306341 A1 | 12/2011 | Klein et al. | |
| 2012/0002568 A1 | 1/2012 | Tiirola et al. | |
| 2012/0020433 A1 | 1/2012 | Bhattad et al. | |
| 2012/0033592 A1 | 2/2012 | Kim et al. | |
| 2012/0058735 A1 | 3/2012 | Vermani et al. | |
| 2012/0063336 A1 | 3/2012 | Shany et al. | |
| 2012/0069887 A1 | 3/2012 | Park et al. | |
| 2012/0069917 A1 | 3/2012 | Liu et al. | |
| 2012/0087425 A1 | 4/2012 | Gomadam et al. | |
| 2012/0087435 A1 | 4/2012 | Gomadam et al. | |
| 2012/0134568 A1* | 5/2012 | Chen et al. | 375/267 |
| 2012/0219042 A1 | 8/2012 | Onggosanusi et al. | |
| 2012/0219083 A1 | 8/2012 | Tong et al. | |
| 2012/0257664 A1 | 10/2012 | Yue et al. | |
| 2012/0275376 A1 | 11/2012 | Sampath et al. | |
| 2012/0275386 A1* | 11/2012 | Frenne et al. | 370/328 |
| 2012/0281620 A1 | 11/2012 | Sampath et al. | |
| 2013/0028068 A1 | 1/2013 | Park et al. | |
| 2013/0028344 A1 | 1/2013 | Chen et al. | |
| 2013/0039284 A1 | 2/2013 | Marinier et al. | |
| 2013/0051256 A1 | 2/2013 | Ong et al. | |
| 2013/0107916 A1 | 5/2013 | Liu et al. | |
| 2013/0182786 A1* | 7/2013 | Frenne et al. | 375/267 |

FOREIGN PATENT DOCUMENTS

| | | |
|---|---|---|
| WO | 2007133564 A3 | 11/2007 |
| WO | 2008009157 A1 | 1/2008 |
| WO | 2008133582 A2 | 11/2008 |
| WO | 2010013950 A2 | 2/2010 |
| WO | 2011147692 A1 | 12/2011 |

OTHER PUBLICATIONS

Motorola, "Uplink Power Control for E-UTRA", 3GPP TSG RAN1 #48, St. Louis, USA, Feb. 12-16, 2007.

(56) References Cited

OTHER PUBLICATIONS

Nortel, "On the discussions of carrier aggregations", 3GPP TSG-RAN Working Group 1 Meeting #55, Prague, Czech Republic, Nov. 10-14, 2008.
NTT DoCoMo, Inc., "Updated Views on Support of Wider Bandwidth in LTE-Advanced", 3GPP TSG RAN WG1 Meeting #54bis, Prague, Czech Republic, Sep. 29-Oct. 3, 2008.
3rd Generation Partnership Project; Technical Specification Group Radio Access Network; User Equipment (UE) radio transmission and reception (FDD) (Release 8), 3GPP TS 25.101 V8.5.1, Sophia Antipolis, France, Jan. 2009.
Lucent Technologies, "Link Error Prediction for E-DCH", TSG-RAN WG1#35, Lisbon, Portugal, Nov. 17-21, 2003.
Ericsson, "On Channel Reciprocity for Enhanced DL Multi-Antenna Transmission", TSG-RAN WG1 #59, Jeju, Korea, Nov. 9-13, 2009.
Ericsson, "System-level evaluation of OFDM—further considerations", TSG-RAN WG1 #35, Lisbon, Portugal, Nov. 17-21, 2003.
Nortel Networks, "OFDM Exponential Effective SIR Mapping Validation, EESM Simulation Results for System-Level Performance Evaluations, and Text Proposal for Section A.4.5 of TR 25.892", 3GPP TSG-RAN-1/TSG-RAN-4 Ad Hoc, Espoo, Finland, Jan. 27-30, 2004.
Park et al., "Efficient Coherent Neighbour Cell Search for Synchronous 3GPP LTE System", Electronic Letters, vol. 44, No. 21, Oct. 2008.
Motorola, "Low-Overhead Feedback of Spatial Covariance Matrix", TSG-RAN WG1 #59, Jeju, Korea, Nov. 9-13, 2009.
Motorola, "Use of UL Covariance for Downlink MIMO in FDD", TSG-RAN WG1 #59, Jeju, Korea, Nov. 9-13, 2009.
3rd Generation Partnership Project, "Technical Specification Group Radio Access Network; Evolved Universal Terrestrial Radio Access (E-UTRA); Multiplexing and channel coding (Release 8)", 3GPP TS 36.212 V8.6.0 (Mar. 2009), Sophia Antipolis, France.
Samsung, "Discussion on Enhanced DL Beamforming", 3GPP TSG-RAN WG1 Meeting #56bis, Seoul, Korea, Mar. 23-27, 2009.
Alcatel-Lucent Shanghai Bell, "Correlation-based Explicit Feedback", 3GPP TSG RAN WG1 Meeting # 59bis, Valencia, Spain, Jan 18-22, 2010.
International Application PCT/IB2010/051088 Search Report dated Sep. 21, 2010.
International Application PCT/IB2010/053272 Search report dated Dec. 27, 2010.
Motorola, "Codebook for 8Tx DL SU-MIMO for LTE-1", TSG-RAN WG1 #59, Jeju, Korea, Nov. 9-13, 2009.
Marvell Semiconductor, "Precoding Options for 8Tx Antennas in LTE-A DL", 3GPP TSG RAN WG1 Meeting #55bis, Ljubljana, Slovenia, Jan. 12-16, 2009.
U.S. Appl. No. 13/052,075, filed Mar. 20, 2011.
Marvell, "Codebook Adaptation for ULA Antenna", 3GPP TSG RAN WG1 Meeting #60, San Francisco, USA, Feb. 22-22, 2010.
U.S. Appl. No. 61/321,386, filed Apr. 6, 2010.
U.S. Appl. No. 12/838,509, filed Jul. 19, 2010.
U.S. Appl. No. 61/294,737, filed Mar. 13, 2010.
U.S. Appl. No. 12/965,878, filed Dec. 12, 2010.
U.S. Appl. No. 12/902,168, filed Oct. 12, 2010.
U.S. Appl. No. 12/903,237, filed Oct. 13, 2010.
Alcatel-Lucent, "Fractional Power Control Using Pilot Power Ration Measurements for the E-UTRA Uplink", 3GPP TSG RAN WG1 # 48, St. Louis, USA, Feb. 12-16, 2007.
Alcatel-Lucent Shanghai Bell, "Considerations on spatial covariance aided implicit feedback for MU-MIMO", 3GPP TSG RAN WG1 Meeting #59, Jeju, Korea, Nov. 9-13, 2009.
Catt, "Feedback enhancements for LTE-A downlink transmission", 3GPP TSG RAN WG1 Meeting #59, Jeju, Korea, Nov. 9-13, 2009.
Ericsson et al., "Way Forward for Rel-10 Feedback Framework", 3GPP TSG RAN WG1 Meeting #60, San Francisco, USA, Feb. 22-22, 2010.
Huawei, "Adaptive Feedback: A New Perspective of the Adaptive Codebook", 3GPP TSG RAN WG1 meeting #58, Shenzhen, China, Aug. 24-28, 2009.
Motorola, "Interference Mitigation via Power Control and FSM Resource Allocation and UE Alignment for E-UTRA Uplink and TP", 3GPPP TSG RAN1 # 44, Denver, USA, Feb. 13-17, 2006.
Marvell, "Successive Codebook Refinement: Further details and evaluation", 3GPP TSG-RAN WG1 #60bis, Beijing, Apr. 12-16, 2010.
Marvell Semiconductor, "Feedback Methods for Exploiting Channel Correlation in LTE-A DL", 3GPP TSG RAN WG1 Meeting #57, Los Angeles, USA, Jun. 29-Jul. 3, 2009 (R1-092395).
Marvell Semiconductor, "Spatial Correlation based transmission schemes for LTE-A DL", 3GPP TSG RAN WG1 meeting #58, Shenzhen, China, Aug. 24-28, 2009.
Samsung, "Comparisons and performance evaluation of differential feedback proposals for Rel 8 PMI enhancements", 3GPP TSG RAN WG1 Meeting #59bis, Valencia, Spain, Jan. 18-22, 2010.
Samsung, "Codebook Design for 8 Tx Transmission in LTE-A", 3GPP TSG RAN WG1 Meeting #56, Athens, Greece, Feb. 9-13, 2009.
International Application PCT/IB2009/052987 Search Report dated Jan. 27, 2010.
Rapporteur (NTT DoCoMo), "Text Proposal for RAN1 TR on LTE Advanced", 3GPP TSG RAN WG1 Meeting #53bis, Warsaw, Poland, Jun. 30-Jul. 4, 2008.
U.S. Appl. No. 12/983,898, filed Jan. 4, 2011.
U.S. Appl. No. 12/723,647 Official Action dated Feb. 6, 2012.
U.S. Appl. No. 12/723,647 Official Action dated Apr. 27, 2012.
U.S. Appl. No. 12/652,044 Official Action dated Feb. 7, 2012.
Alcatel-Lucent et al., "Way Forward on Enhancement for Rel.10 DL MIMO", 3GPP TSG RAN # 62 Meeting, Madrid, Spain, Aug. 23-27, 2010.
Alcatel -Lucent, "Further Analysis of Companion Feedback Performance and Feedback Signaling Overhead Reduction", 3GPP TSG RAN # 62 Meeting, Madrid, Spain, Aug. 23-27, 2010.
Alcatel-Lucent et al., "Way Forward on CQI/PMI Reporting Enhancement on PUSCH 3-1 for 2,4 and 8TX", 3GPP TSG RAN # 62BIS, Xian, China, Oct. 11-15, 2010.
Marvell, "CQI Enhancement for 4Tx", 3GPP TSG RAN # 62BIS, Xian,China, Oct. 11-15, 2010.
NEC Group, "Enhancing MU-MIMO CQI", 3GPP TSG RAN # 62BIS, Xian, China, Oct. 11-15, 2010.
LG Electronics, "Further Discussion on CQI/PMI Enhancement", 3GPP TSG RAN # 62BIS, Xian, China, Oct. 11-15, 2010.
Samsung, "Coordinated Multi-Point Operation for LTE", Istanbul, Turkey, Dec 7-10, 2010.
Alcatel-Lucent et al., "Way Forward on CSI Feedback for Re1.10 DL MIMO", 3GPP TSG RAN # 62 Meeting, Madrid, Spain, Aug. 23-27, 2010.
Marvell, "Two-Component PMI Codebook for 8TX", 3GPP TSG RAN # 62 Meeting, Madrid, Spain, Aug. 23-27, 2010.
Marvell, "Details of PUCCH 1-1 for 8Tx", 3GPP TSG RAN # 63, Jacksonville, USA, Nov. 15-19, 2010.
Samsung, "Preliminary CoMP JP Results for Homogeneous Networks", 3GPP TSG RAN # 64, Taipei, Taiwan, Feb. 21-25, 2011.
Huawei, "Performance Evaluation of Phase 1: Downlink Homogeneous Network with High Tx Power RRHs", 3GPP TSG RAN # 64, Taipei, Taiwan, Feb. 21-25, 2011.
ZTE, "Initial CoMP Evaluation for Homogeneous Network with High Tx Power RRHs", 3GPP TSG RAN # 64, Taipei, Taiwan, Feb. 21-25, 2011.
U.S. Appl. No. 13/346,737, filed Jan. 10, 2012.
U.S. Appl. No. 13/433,293, filed Mar. 29, 2012.
International Application PCT/IB2010/055763 Search Report dated Jun. 14, 2011.
International Application PCT/IB2011/050015 Search Report dated Jul. 5, 2011.
Marvell, "Downlink MIMO with Coordinated Beamforming and Scheduling", 3GPP TSG RAN WG1 59, Jeju, South Korea, Nov. 9-14, 2009.
Texas Instruments, "Views and Simulation Results on 4Tx Codebook Enhancement", 3GPP TSG RAN WG1 62, Madrid, Spain, Aug. 23-27, 2010.

(56) References Cited

OTHER PUBLICATIONS

Texas Instruments, "Higher CSI feedback accuracy for 4/8Tx Rel. 10 DL MIMO", 3GPP TSG RAN WG1 62, Madrid, Spain, Aug. 23-27, 2010.
Ericsson, "Design and Evaluation of Precoder Codebooks for CSI Feedback", 3GPP TSG RAN WG1 61bis, Dresden, Germany, Jun. 28-Jul. 2, 2010.
Rapporteur, "Coordinated Multi-Point Operation for LTE", TSG RAN WG1 50, Istanbul, Turkey, Dec. 7-10, 2010.
Alcatel-Lucent et al., "Way Forward on CSI Feedback for Rel.10 DL MIMO", 3GPP TSG RAN WG1 62, Madrid, Spain, Aug. 23-27, 2010.
Alcatel-Lucent et al., "Way Forward on 8Tx Codebook for Rel.10 DL MIMO", 3GPP TSG RAN WG1 62, Madrid, Spain, Aug. 23-27, 2010.
U.S. Appl. No. 61/390,423, filed Oct. 6, 2010.
U.S. Appl. No. 61/432,980, filed Jan. 14, 2011.
U.S. Appl. No. 61/390,511, filed Oct. 6, 2010.
International Application No. PCT/IB2009/052726 Search Report dated Jan. 28, 2010.
International Application No. PCT/IB2010/050014 Search Report dated Jun. 15, 2010.
International Application No. PCT/IB2010/050797 Search Report dated Jul. 15, 2010.
International Application No. PCT/IB2010/051089 Search Report dated Jul. 9, 2010.
Ericsson, "Carrier Aggregation in LTE-Advanced", TSG-RAN WG1 #53bis, Warsaw, Poland, Jun. 30-Jul. 4, 2008.
Viswanath et al., "Opportunistic Beamforming Using Dumb Antennas," IEEE Transactions on Information Theory, vol. 48, No. 6, pp. 1277-1294, Jun. 2002.
Sharif et al., "On the Capacity of MIMO Broadcast Channels with Partial Side Information," IEEE Transactions on Information Theory, vol. 51, No. 2, pp. 506-522, Feb. 2005.
Texas Instruments, "Codebook Design for E-UTRA MIMO Precoding", 3GPP TSG RAN WG1 46bis, Seoul, Korea, Oct. 9-13, 2006.
Samsung, "Codebook based Precoding for 8 Tx Transmission in LTE-A", 3GPP TSG RAN WG1 Meeting #55, Prague, Czech Republic, Nov. 10-14, 2008.
Qualcomm Europe, "Link Analysis for 4×2 and 4×4 Precoder Set Decision", 3GPP TSG-RAN WG1 #48bis, St. Julian's, Malta, Mar. 26-30, 2007.
3GPP TR 25.892 V6.0.0, "3rd Generation Partnership Project; Technical Specification Group Radio Access Network; Feasibility Study for Orthogonal Frequency Division Multiplexing (OFDM) for UTRAN enhancement (Release 6)", Sophia Antipolis, France, Jun. 2004.
Samsung, "CQI reporting for MU-MIMO", 3GPP TSG RAN WG1 Meeting #54, Jeju, Korea, Aug. 18-22, 2008.
Motorola, "Some Results on DL-MIMO Enhancements for LTE-A", TSG-RAN WG1 #55bis, Ljubljana, Slovenia, Jan. 12-16, 2009.
Alcatel-Lucent, ""Best Companion" reporting for improved single-cell MU-MIMO pairing", 3GPP TSG RAN WG1 #56 Meeting, Athens, Greece, Feb. 9-13, 2009.
Nokia Siemens Networks, "LTE-Advanced SU-MIMO UE Transmission in LTE Release 8 Network", 3GPP TSG RAN WG1 Meeting #57, San Francisco, USA, May 4-8, 2009 (R1-091773).
3GPP TS 25.214 V8.5.0, 3rd Generation Partnership Project; Technical Specification Group Radio Access Network; Physical Layer Procedures (FDD) (Release 8), Sophia Antipolis, France, Mar. 2009.
IEEE Standard 802.16 for Local and metropolitan area networks, "Part 16: Air Interface for Fixed Broadband Wireless Access Systems", Revision of IEEE Standard 802.16-2001, IEEE Computer Society and IEE Microwave Theory and Techniques Society, USA, Oct. 1, 2004.
NTT DoCoMo et al., "Prioritized Deployment Scenarios for LTE-Advanced Studies", 3GPP TSG RAN WG4 Meeting # 50, Athens, Greece, Feb. 9-13, 2009 (R4-091011).

Hanzo et al., "OFDM and MCCDMA for Broadband Multi-User Communications, WLANs and Broadcasting", Wiley-IEEE Press, chapter 14, pp. 485-548, Sep. 19, 2003.
China Mobile et al., "Framework for LTE PDSCH DRS Demodulation Requirements", 3GPP TSG RAN WG4 Meeting #49, Prague, Czech Republic, Nov. 10-14, 2008.
Qualcomm Europe, "Downlink RS Structure in Support of Higher-Order MIMO", 3GPP TSG RAN WG1 Meeting #57, San Francisco, USA, May 4-8, 2009.
"RAN1 Chairman Notes", 3GPP TSG RAN WG1 Meeting #55bis, Ljubljana, Slovenia, Jan. 12-16, 2009.
Marvell Semiconductor, "Number of Codewords for 8×8 SU-MIMO in LTE-A DL", 3GPP TSG RAN WG1 Meeting #55bis, Ljubljana, Slovenia, Jan. 12-16, 2009.
LG Electronics, "Consideration of DL-MIMO in LTE-Advanced", 3GPP TSG RAN WG1 Meeting #55, Prague, Czech Republic, Nov. 10-14, 2008.
3rd Generation Partnership Project; Technical Specification Group Radio Access Network; Further Advancements for E-UTRA Physical Layer Aspects (Release 9), 3GPP TS 36.814 V0.4.1 (Feb. 2009), Sophia Antipolis, France.
3rd Generation Partnership Project; "Technical Specification Group Radio Access Network; Evolved Universal Terrestrial Radio Access (E-UTRA)"; Physical Layer Procedures (Release 8), 3GPP TS 36.213 V8.6.0 (Mar. 2009), Sophia Antipolis, France.
3rd Generation Partnership Project; Technical Specification Group Radio Access Network; Evolved Universal Terrestrial Radio Access (E-UTRA); Physical Channels and Modulation (Release 8), 3GPP TS 36.211 V8.4.0 (Sep. 2008), Sophia Antipolis, France.
Alcatel-Lucent, "CQI and CSI Feedback Compression", 3GPP TSG RAN WG1 #54bis, Prague, Czech Republic, Sep. 29-Oct. 3, 2008.
Huawei, "DL MIMO Codebook", 3GPP TSG RAN WG1 Meeting #56bis, Seoul, South Korea, Mar. 23-27, 2009.
Huawei, "Adaptive Codebook Designs for MU-MIMO", 3GPP TSG RAN WG1 Meeting #56bis, Seoul, South Korea, Mar. 23-27, 2009.
Motorola, "On UE Feedback to Support LTE-A MU-MIMO and CoMP Operations", TSG-RAN WG1 #56bis, Seoul, South Korea, Mar. 23-27, 2009.
Huawei, "Adaptive Codebook Designs for DL MIMO", 3GPP TSG RAN WG1 Meeting #57, San Francisco, CA USA, May 3-8, 2009.
Ericsson, "On CSI feedback for ITU Requirement Fulfilling CoMP Schemes", TSG-RAN WG1 #57, San Francisco, USA, May 4-8, 2009.
Motorola, "Spatial Correlation Feedback to Support LTE-A MU-MIMO and CoMP: System Operation and Performance Results", TSG-RAN WG1 #57, San Francisco, USA, May 4-8, 2009.
Xia et al., "Design and Analysis of Transmit—Beamforming based on Limited-Rate Feedback", IEEE Transactions on signal processing (Draft), Minneapolis, MN, Mar. 16, 2005.
Huawei, "The Impact of CA on Mobility in LTE-A", 3GPP TSG RAN WG1 Meeting #56, Athens, Greece, Feb. 9-13, 2009.
U.S. Appl. No. 61/111,475, filed Nov. 5, 2008.
Research in Motion, UK Limited, "Uplink Power Control for Carrier Aggregation", 3GPP TSG RAN WG1 Meeting # 57b, Lon Angeles, USA, Jun. 29-Jul. 3, 2009 (R1-092415).
Nokia Siemens Networks, "PUSCH Power Control for LTE-Advanced", 3GPP TSG RAN WG1 Meeting # 57bis, Los Angeles, USA, Jun. 29-Jul. 3, 2009 (R1-092574).
3rd Generation Partnership Project; Technical Specification Group Radio Access Network; Radio Frequency (RF) System Scenarios (Release 5), 3GPP TR 25.942 V5.3.0, Sophia Antipolis, France, Jun. 2004.
Nokia Siemens Networks, "Autonomous Component Carrier Selection for LTE Advanced", 3GPP TSG RAN WG1 Meeting #54, Jeju Island, Korea, Aug. 18-22, 2008 (R1-083103).
Nokia Siemens Networks, "Algorithms and Results for Autonomous Component Carrier Selection for LTE-Advanced", 3GPP TSG RAN WG1 Meeting #55, Prague, Czech Republic, Nov. 10-14, 2008 (R1-084321).
Nokia Siemens Networks, "Use of Background Interference Matrix for Autonomous Component Carrier Selection for Lte-Advanced", 3GPP TSG RAN WG1 Meeting #55-bis, Ljubljana, Slovenia, Jan. 12-16, 2009 (R1-090235).

(56) References Cited

OTHER PUBLICATIONS

Qualcomm Europe, Notion of Anchor Carrier in LTE-A, 3GPP TSG RAN WG1 Meeting #55-bis, Ljubljana, Slovenia, Jan. 12-16, 2009 (R1-080356).
Samsung, "UL Transmission Power Control in LTE-A", 3GPP TSG RAN WG1 Meeting #56bis, Seoul, Korea, Mar. 23-27, 2009 (R1-091250).
Huang et al., "A Limited Feedback Precoding System with Hierarchical Codebook and Linear Receiver", IEEE Transactions on Wireless Communications, vol. 7, No. 12, pp. 4843-4848, Dec. 2008.
Kim et al., "Efficient Feedback via Subspace-Based Channel Quantization for Distributed Cooperative Antenna Systems with Temporarily Correlated Channels", EURASIP Journal on Advances in Signal Processing, vol. 2008, Nov. 23, 2007.
NTT DoCoMo, "Views on Codebook Design for Downlink 8Tx MIMO", 3GPP TSG RAN WG1 Meeting #59bis, Valencia, Spain, Jan. 18-22, 2010.
Alcatel Lucent, "Overview of Hierarchical Codebook Approach", 3GPP TSG RAN WG1 Meeting #59bis, Valencia, Spain, Jan. 18-22, 2009.
JP Patent Application # 2011-024295 Official Action dated Sep. 11, 2012.
Samsung, "Precoding for polarized 4Tx configurations", 3GPP TSG RAN WG1 Meeting #48bis, St Julian's, Malta, Mar. 26-30, 2007.
Mondal et al., "Rank-Independent Codebook Design from a Quaternary Alphabet", Proceedings of 41st Asilomar Conference on Signals, Systems and Computers (ACSSC), pp. 297-301, Nov. 7, 2007.
JP Patent Application # 2011-544111 Official Action dated Nov. 6, 2012.
Japanese Patent Application # 2011-544111 Office Action dated Mar. 12, 2013.
U.S. Appl. No. 13/252,218 Office Action dated Apr. 11, 2013.
Zte, "Link Analysis of 4Tx Codebook Design for DL SU-MIMO", 3GPP TSG-RAN WG1 #48bis, St. Julians, Malta, Mar. 26-30, 2007.
Asahi, H., "A Function Generator for Walsh Order Hadamard Matrix and Fast Walsh-Hadamard Transform", Geoinformatics, vol. 11, No. 1, pp. 3-9, year 2000.
U.S. Appl. No. 12/253,078 Office Action dated May 23, 2013.
U.S. Appl. No. 12/477,152 Official Action dated Jun. 26, 2012.
U.S. Appl. No. 12/723,645 Official Action dated Aug. 31, 2012.
U.S. Appl. No. 12/723,647 Official Action dated Aug. 17, 2012.
U.S. Appl. No. 12/652,044 Official Action dated Jun. 29, 2012.
U.S. Appl. No. 12/838,509 Official Action dated Jun. 21, 2012.
International Application PCT/IB2012/051511 Search Report dated Aug. 31, 2012.
U.S. Appl. No. 12/965,878 Official Action dated Apr. 1, 2013.
Japanese Patent Application # 2011024295 Office Action dated Jan. 15, 2013.
International Application PCT/IB2012/056181 Search Report dated Mar. 4, 2013.
International Application PCT/IB2012/056289 Search Report dated Mar. 26, 2013.
International Application PCT/IB2012/056182 Search Report dated Feb. 26, 2013.
U.S. Appl. No. 12/902,168 Office Action dated Aug. 5, 2013.
U.S. Appl. No. 12/983,898 Office Action dated Sep. 12, 2013.
U.S. Appl. No. 13/052,075 Office Action dated Jul. 15, 2013.
U.S. Appl. No. 13/766,790 Office Action dated Jul. 22, 2013.
U.S. Appl. No. 12/903,237 Office Action dated Aug. 16, 2013.
International Application PCT/IB2013/052963 Search Report dated Sep. 27, 2013.

* cited by examiner

US 8,611,448 B2

CODEBOOK ADAPTATION IN MIMO COMMUNICATION SYSTEMS USING MULTILEVEL CODEBOOKS

CROSS-REFERENCE TO RELATED APPLICATIONS

This application claims the benefit of U.S. Provisional Patent Application 61/303,217, filed Feb. 10, 2010, and U.S. Provisional Patent Application 61/329,798, filed Apr. 30, 2010, whose disclosures are incorporated herein by reference.

FIELD OF THE DISCLOSURE

The present disclosure relates generally to communication systems, and particularly to methods and systems for providing communication channel feedback.

BACKGROUND

In some Multiple-Input Multiple-Output (MIMO) communication systems, the transmitter adapts its transmission based on communication channel feedback that is produced by the receiver. In some cases, for example in Long-Term Evolution (LTE) and LTE-Advanced (LTE-A) systems, the transmitter selects a precoding scheme for distributing the signal to the various transmit antenna ports based on the channel feedback. An example channel feedback scheme is described in "Correlation Based Explicit Feedback," document R1-100719 (R1-100423), 3GPP TSG RAN WG1 Meeting, Valencia, Spain, Jan. 18-22, 2010, which is incorporated herein by reference in its entirety.

In some channel feedback methods, the transmitter and receiver use a predefined set of precoding matrices (a "codebook"), and the channel feedback comprises preferred Precoding Matrix Indicators (PMI) that point to precoding matrices selected from the codebook.

Channel feedback schemes that modify the codebook used by the transmitter and the receiver over time based on a signal Spatial Covariance Function (SCF) have been proposed. Such schemes are sometimes referred to as "codebook adaptation" schemes. An example of codebook adaptation is described in "Adaptive Codebook Designs for MU-MIMO," document R1-091282, Third Generation Partnership Project (3GPP) Technical Specification Group (TSG) Radio Access Network (RAN) Working Group 1 (WG1) meeting, Seoul, Korea, Mar. 23-27, 2009, which is incorporated herein by reference.

The description above is presented as a general overview of related art in this field and should not be construed as an admission that any of the information it contains constitutes prior art against the present patent application.

SUMMARY

An embodiment that is described herein provides a method that includes holding in a receiver a definition of a codebook including precoding matrices, and a definition of multiple sub-codebooks including different respective subsets of the precoding matrices in the codebook. A sub-codebook is selected in coordination with a transmitter, for use in a given time interval or frequency range. A Multiple-Input Multiple-Output (MIMO) signal that is transmitted from the transmitter is received. Feedback is generated in the receiver based on the received MIMO signal. The feedback is indicative of one or more preferred precoding matrices, which are chosen from the selected sub-codebook and which are to be used in precoding subsequent MIMO signals in respective partitions of the given time interval or frequency range. The feedback is transmitted from the receiver to the transmitter.

In some embodiments, holding the definition includes arranging the sub-codebooks in the codebook in multiple levels that progressively increase in precoding resolution and decrease in precoding range. In an embodiment, holding the definition includes adding to each of the sub-codebooks a diluted set of the precoding matrices having a broadest precoding range.

In a disclosed embodiment, holding the definition includes defining each sub-codebook to represent a respective angular range of transmission beam directions of the transmitter, and arranging the sub-codebooks in the levels includes populating the levels with the sub-codebooks that progressively decrease in a size of the angular range. In an example embodiment, arranging the sub-codebooks in the levels includes causing respective angular ranges of the sub-codebooks in a given level to partially overlap. In another embodiment, selecting the sub-codebook includes signaling between the transmitter and the receiver a respective level and a respective index within the level of the selected sub-codebook.

In some embodiments, holding the definition includes formulating each of at least some of the precoding matrices using a respective set of Discrete Fourier Transform (DFT) coefficients. In an embodiment, selecting the sub-codebook includes deciding on the selected sub-codebook in the receiver and indicating the selected sub-codebook to the transmitter. In a disclosed embodiment, selecting the sub-codebook includes receiving a notification of the selected sub-codebook from the transmitter.

In another embodiment, selecting the sub-codebook includes evaluating a Spatial Covariance Function (SCF) of a communication channel over which the MIMO signal is received, and selecting the sub-codebook based on the evaluated SCF. In an embodiment, evaluating the SCF includes estimating the SCF independently in each of the transmitter and the receiver, and selecting the sub-codebook independently in each of the transmitter and the receiver based on the independently-evaluated SCF.

There is additionally provided, in accordance with an embodiment that is described herein, apparatus including a memory, a receiver, a processor and a feedback transmitter. The memory is configured to hold a definition of a codebook including precoding matrices and a definition of multiple sub-codebooks including different respective subsets of the precoding matrices in the codebook. The receiver is configured to receive a Multiple-Input Multiple-Output (MIMO) signal that is transmitted from a remote transmitter. The processor is configured to select in coordination with the remote transmitter a sub-codebook for use in a given time or frequency range, and to generate, based on the received MIMO signal, feedback that is indicative of one or more preferred precoding matrices, which are chosen from the selected sub-codebook and which are to be used in precoding subsequent MIMO signals in respective partitions of the given time or frequency range. The feedback transmitter is configured to transmit the feedback to the remote transmitter.

In some embodiments, a mobile communication terminal includes the disclosed apparatus. In some embodiments, a chipset for processing signals in a mobile communication terminal includes the disclosed apparatus.

In some disclosed embodiments, a receiver holds a definition of a codebook including precoding matrices and a definition of multiple sub-codebooks including different respective subsets of the precoding matrices in the codebook. A sub-codebook is selected in coordination with a transmitter, for use in a given time or frequency range. A Multiple-Input Multiple-Output (MIMO) signal that is transmitted from the transmitter is received. Based on the received MIMO signal, a preferred precoding matrix is chosen from the selected sub-codebook for use in precoding subsequent MIMO signals in the given time or frequency range. An indication of the preferred precoding matrix is sent from the receiver to the transmitter.

The present disclosure will be more fully understood from the following detailed description of the embodiments thereof, taken together with the drawings in which:

DETAILED DESCRIPTION OF EMBODIMENTS

Figure 1:
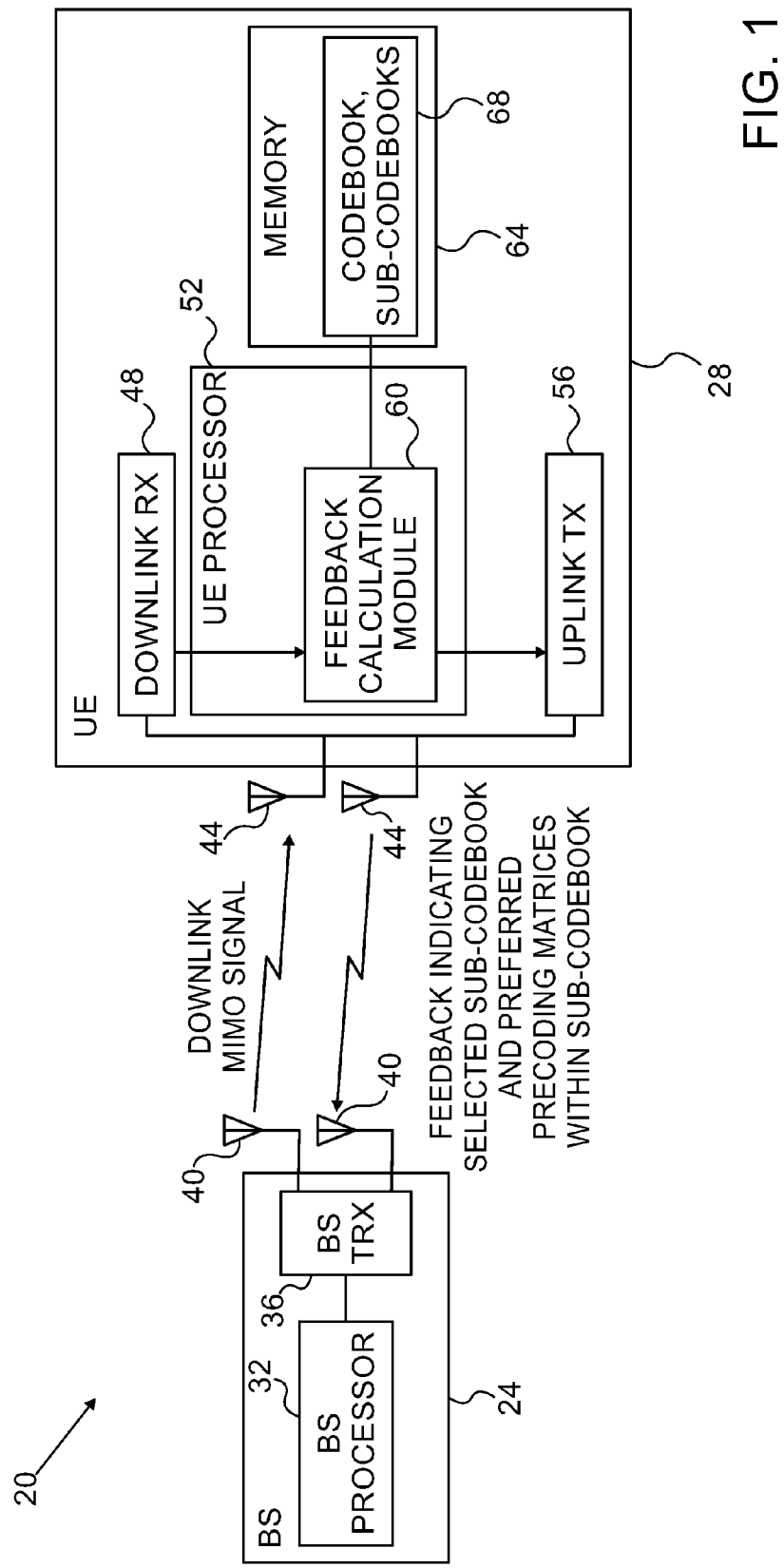
FIG. 1 is a block diagram that schematically illustrates a Multiple-Input Multiple-Output (MIMO) communication system, in accordance with an embodiment that is described herein.

Any set of precoding matrices ("codebook") can be viewed as covering a certain range of possible precoding matrices with a certain precoding resolution or accuracy. When designing codebook-based feedback schemes, precoding accuracy and precoding range are often traded off against feedback bandwidth. For example, although a large codebook may cover a large precoding range at high precoding accuracy, such a codebook typically requires large feedback bandwidth in order to signal the preferred precoding matrices. A small codebook requires less feedback bandwidth, but this bandwidth saving typically comes at the expense of smaller precoding range and/or poorer precoding accuracy.

Embodiments that are described herein provide improved methods and systems for providing channel feedback in MIMO communication systems. In the disclosed embodiments, the transmitter and receiver hold mutually-agreed definitions of a codebook and of multiple sub-codebooks, i.e., multiple different subsets of the codebook. For a given time interval or frequency range, the transmitter and receiver apply a certain sub-codebook instead of the entire codebook. In other words, when calculating channel feedback for precoding signals in the given time interval or frequency range, the receiver selects preferred precoding matrices only from the corresponding sub-codebook and not from the entire codebook. As a result, the feedback bandwidth (e.g., the number of bits needed for signaling the preferred precoding matrix) is reduced.

In some embodiments, the receiver signals the channel feedback to the transmitter at two time/frequency granularities: Selection of the sub-codebook is signaled at a relatively coarse granularity, while selection of the preferred precoding matrix within the selected sub-codebook is signaled at finer granularity. In an example embodiment, the receiver selects a (possibly different) sub-codebook every several Transmission Time Intervals (TTIs), and chooses a preferred precoding matrix from the currently-selected sub-codebook every TTI.

Since the receiver selects the preferred precoding matrices only from a partial sub-codebook and not from the entire codebook, the number of bits needed for signaling the selected matrices is small. Signaling of the valid codebook is carried out at coarse granularity that has little effect on feedback bandwidth. Thus, feedback bandwidth is reduced without degradation in precoding range or accuracy.

Unlike some codebook adaptation schemes that adapt the actual precoding matrices over time, the precoding matrices signaled by the receiver in the disclosed techniques are all predefined and agreed upon between the transmitter and the receiver. As such, the receiver signals suitable indications of the selected matrices, e.g., matrix indices, and has no need to signal entire matrices or adaptations of entire matrices. Moreover, the precoding matrices used in the disclosed feedback schemes are typically designed for simplified implementation of the precoding operation, e.g., matrices whose elements are drawn from a simple alphabet and/or Constant Modulus (CM) matrices.

FIG. 1 is a block diagram that schematically illustrates a Multiple-Input Multiple-Output (MIMO) communication system 20, in accordance with an embodiment that is described herein. In the present example, system 20 comprises an LTE or LTE-A system. In alternative embodiments, however, system 20 may operate in accordance with any other suitable communication standard or specification that uses MIMO signals, such as, for example, Wideband Code Division Multiple Access (WCDMA), WiMAX or WiFi systems.

System 20 comprises a Base Station (BS) 24, which communicates with a mobile communication terminal 28 (also referred to as User Equipment—UE). Although FIG. 1 shows only a single BS and a single UE for the sake of clarity, real-life communication systems typically comprise multiple BSs 24 and multiple UEs 28. BS 24 comprises a BS processor 32, which manages the operation of the BS. A BS transceiver (TRX) 36 generates downlink MIMO signals for transmission to UEs 28 and receives uplink signals from the UEs. Amongst other tasks, TRX 36 precodes the downlink signals destined to a given UE using a precoding matrix that is selected based on feedback from that UE. BS 24 transmits the downlink signals and receives the uplink signals using an array of BS antennas 40.

UE 28 comprises one or more antennas 44, which receive the MIMO downlink signals that are transmitted from BS 24, and transmit the uplink signals to the BS. UE 28 comprises a downlink receiver (RX) 48 that receives and demodulates the downlink signals, an uplink transmitter (TX) 56 that generates and transmits the uplink signals, and a UE processor 52 that manages the UE operation and controls the various UE elements.

In some embodiments, UE processor 52 comprises a feedback calculation module 60, which calculates feedback regarding the downlink MIMO communication channel between BS antennas 40 and UE antennas 44. Feedback module 60 calculates the feedback based on the downlink signals received by downlink receiver 48, e.g., based on reference signals that are transmitted as part of the downlink signals. Examples of reference signals comprise Common Reference Signals (CRS) in LTE systems, and Channel State Information Reference Signals (CSI-RS) in LTE-A systems. Alternatively, module 60 may calculate the feedback based on any other suitable part of the received downlink signals. Module 60 provides the calculated feedback to uplink transmitter 56, and the uplink transmitter transmits the feedback information to BS 24.

In BS 24, BS TRX 36 receives and demodulates the uplink signal, so as to extract the feedback sent by UE 28. BS processor 32 uses the feedback to control subsequent downlink transmissions. Typically, the BS processor sets the downlink precoding scheme (the relative signal phases and amplitudes in the different antennas of array 40) based on the feedback.

In the present example, the channel feedback scheme in system 20 uses a predefined codebook, i.e., a list of precoding matrices that are agreed upon between BS 24 and UE 28. In addition, BS 24 and UE 28 hold agreed-upon definitions of multiple sub-codebooks, i.e., multiple different subsets of the codebook. The use of the sub-codebooks for providing efficient feedback is explained in detail further below. In an embodiment, UE 28 comprises a memory 64, which holds definitions 68 of the codebook and sub-codebooks. Memory 64 may comprise any suitable type of memory, e.g., Random Access Memory (RAM) or non-volatile memory such as Flash memory. BS 24 also holds the definitions of the codebook and sub-codebooks in a suitable memory (not shown in the figure) that is accessible to BS processor 32.

The BS and UE configurations shown in FIG. 1 are example configurations, which are depicted solely for the sake of clarity. In alternative embodiments, any other suitable BS and UE configurations can also be used. Some UE and BS elements that are not mandatory for understanding of the disclosed techniques have been omitted from the figures for the sake of clarity. The different BS and UE elements typically are implemented using dedicated hardware, such as using one or more Application-Specific Integrated Circuits (ASICs), Radio frequency Integrated Circuits (RFIC) and/or Field-Programmable Gate Arrays (FPGAs). Alternatively, some elements may be implemented using software executing on programmable hardware, or using a combination of hardware and software elements.

In some embodiments, some or all of the elements of UE 28 are fabricated in a chip-set. When implementing some or all of the disclosed techniques in software on a programmable processor, the software may be downloaded to the processor in electronic form, over a network, for example, or it may, alternatively or additionally, be provided and/or stored on non-transitory tangible media, such as magnetic, optical or electronic memory.

As noted above, BS 24 and UE 28 hold a definition of multiple sub-codebooks of the codebook. Each sub-codebook comprises a respective subset of the precoding matrices in the codebook. Overlap is typically permitted between sub-codebooks. In other words, a precoding matrix is permitted to appear in more than one sub-codebook. Typically, the BS and UE select a given sub-codebook for precoding signals that fall in a given time interval or frequency range. In some embodiments, the sub-codebook selection is based on the signal at the UE. Thus, when calculating the channel feedback, the UE chooses the preferred precoding matrix only from the appropriate sub-codebook (whose identity is known to the BS) and not from the entire codebook. Since the sub-codebook size is considerably smaller than the codebook size, the UE is able to signal the identity of the preferred precoding matrix using a small number of bits.

The codebook can be viewed as covering a certain range or space of precoding matrices. In some embodiments, each sub-codebook covers a certain sub-range or sub-space. For illustrative purposes (and purely by way of example) consider an implementation in each precoding matrix in the codebook corresponds to a certain beam direction. In other words, each precoding matrix causes BS 24 to transmit the downlink signal in a certain geometrical angle relative to antenna array 40. In this scenario, the codebook can be viewed as covering the angular coverage area of BS 24 with a certain angular resolution. Each sub-codebook can be viewed as covering a certain sub-range of the angular coverage area.

In this illustrative example, when UE 28 is located in a certain angular sector in the BS coverage area, the BS and UE may select and apply a sub-codebook that is suitable for covering this angular sector. Using this technique, the entire coverage area of BS 24 is covered with precoding matrices at high angular resolution. At the same time, this high resolution does not require high feedback bandwidth, since the precoding matrices are chosen only from the currently-valid (and relatively small-size) sub-codebook.

When the UE moves relative to the BS such that the currently-valid sub-codebook no longer provides adequate coverage, the BS and UE typically switch to another sub-codebook that better matches the UE's new location. The change of sub-codebook involves some signaling overhead between the UE and BS, but his event occurs at relatively large intervals, and the effect of the overhead on the overall feedback bandwidth is typically small. (Note that in many practical scenarios the preferred beam direction for transmitting to the UE differs from the actual geometrical direction of the UE relative to the BS antenna array, e.g., because of multipath. Nevertheless, the illustrative example described above holds for multipath scenarios, as well.)

In some embodiments, the sub-codebooks are arranged in multiple levels, such that each level increases in precoding accuracy or resolution, but decreases in precoding range. In an example embodiment, the UE and BS signal the selected codebook by signaling the level number, and an index of the selected codebook within this level. In alternative embodiments, various other multi-level codebook structures and signaling schemes can be used.

Figure 2:
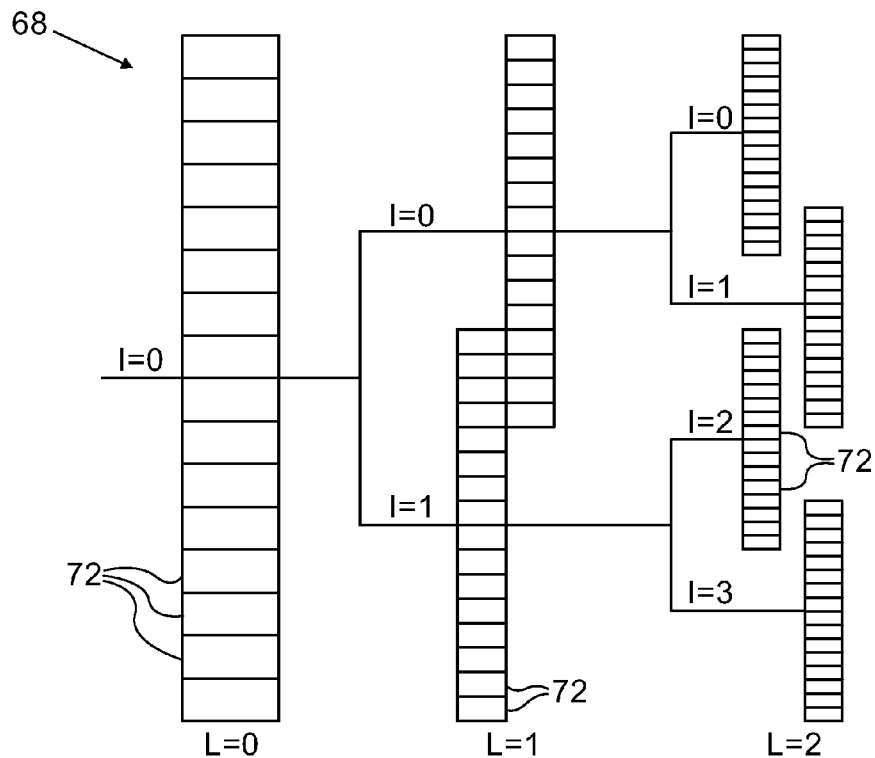
FIG. 2 is a diagram that schematically illustrates a multi-level codebook, in accordance with an embodiment that is described herein.

FIG. 2 is a diagram that schematically illustrates codebook definition 68, in accordance with an embodiment that is described herein. In the present example, the codebook is partitioned into a total of seven sub-codebooks that are arranged in three levels. Each sub-codebook comprises multiple precoding matrices (referred to as codewords in this context).

Each sub-codebook is identified by a level index $L \in \{0,1,2\}$, and a sub-codebook index I within the level. In the present example, the first level (L=0) includes a single sub-codebook (L=0,I=0) that covers the entire precoding range with a relatively coarse precoding resolution. The second level (L=1) includes two sub-codebooks (L=1,I=0 and L=1,I=1) that cover two respective sub-ranges (e.g., two angular coverage sectors) with higher resolution than that of level L=0. A certain overlap exists between the two sub-codebooks of Level L=1.

The third level (L=2) includes four sub-codebooks (L=2, I=0, L=2,I=1, L=2,I=2 and L=2,I=3) that cover four respective sub-ranges (e.g., four angular coverage sectors) that are smaller in precoding range but higher in precoding resolution than the sub-codebooks of the preceding level L=1. The four sub-codebooks of level L=2 also have a certain overlap. In some embodiments, BS and UE 28 coordinate the selection of a given sub-codebook by signaling the level index and sub-codebook index values, i.e., the values of L and I.

The sub-codebook definition of FIG. 2 is an example definition, which is chosen purely for the sake of conceptual clarity. In alternative embodiments, system 20 may use any other suitable configuration of sub-codebooks. When using a multi-level sub-codebook configuration, any suitable number of levels and any suitable number of sub-codebooks per level can be used. Further alternatively, system 20 may use a sub-codebook scheme that is not arranged in levels. In such an arrangement, each sub-codebook comprises any suitable number of precoding matrices (codewords).

In some embodiments, system 20 selects sub-codebooks at a certain coarse time granularity (i.e., with relatively long time intervals between successive selections), and chooses precoding matrices from these sub-codebooks at a certain fine time granularity (i.e., with relatively short time intervals between precoding matrix selection). Each precoding matrix would then correspond to a given wide frequency range. In a typical embodiment (although not necessarily) the precoding matrices are not produced simultaneously but rather in succession, one matrix for each time interval.

In alternative embodiments, system 20 selects sub-codebooks at a certain coarse frequency granularity (i.e., the selected sub-codebook corresponds to a relatively wide frequency band), and chooses precoding matrices from these sub-codebooks at a certain fine frequency granularity (i.e., the selected precoding matrix corresponds to a relatively narrow partial sub-band within the frequency band). In an example embodiment of this sort, both the sub-codebook selection and precoding matrices selections are made at a single time instant.

In an example embodiment, system 20 uses wideband sub-codebooks, i.e., sub-codebooks that are valid over the entire frequency range, and re-selects a sub-codebook at certain time intervals. In alternative embodiments, system 20 re-selects sub-codebooks for various partial spectral sub-bands. The description that follows demonstrates the dual-granularity operation in the time domain, for the sake of clarity. In alternative embodiments, however, similar dual-granularity operation is applied in the frequency domain.

Figure 3:
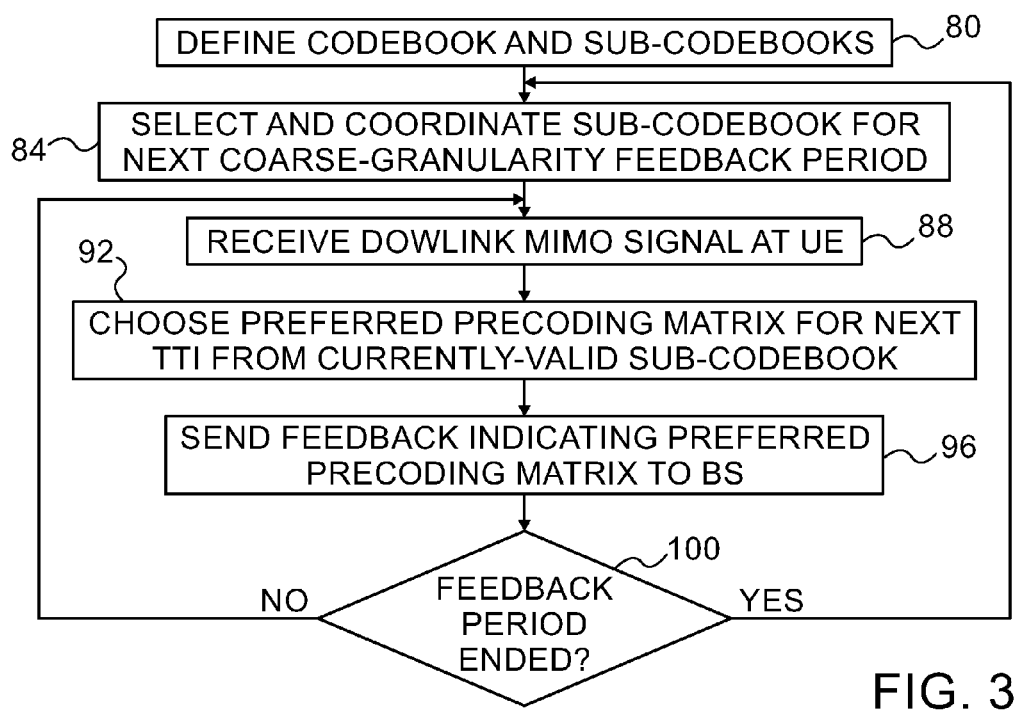
FIG. 3 is a flow chart that schematically illustrates a method for providing communication channel feedback, in accordance with an embodiment that is described herein.

FIG. 3 is a flow chart that schematically illustrates a method for providing communication channel feedback, in accordance with an embodiment that is described herein. The method begins by defining the codebook and sub-codebooks to be used by system 20, at a definition operation 80. In this embodiment, system 20 selects a sub-code book for every coarse-granularity feedback period, which in the present example comprises a predefined number of TTIs (e.g., ten TTIs). Within a certain coarse-granularity feedback period, system 20 selects a preferred precoding matrix from the applicable sub-codebook every TTI. In alternative embodiments, any other suitable time intervals can be used.

At a sub-codebook selection operation 84, BS 24 and UE 28 coordinate a selection of a sub-codebook for use in the next coarse-granularity feedback period. Receiver 48 of UE 28 receives downlink MIMO signals, at a reception operation 88. Module 60 in UE processor 52 chooses a preferred precoding matrix for the next TTI based on the received downlink MIMO signals, at a matrix selection operation 92. Module 60 chooses the preferred precoding matrix from the sub-codebook that was selected at operation 84 above.

Transmitter 56 of UE 28 transmits to BS 24 feedback that is indicative of the chosen preferred precoding matrix, at a feedback transmission operation 96. BS processor 36 precodes the downlink MIMO signals in the next TTI based on the preferred precoding matrix that was indicated in the feedback.

UE processor 52 checks whether the present coarse-granularity feedback period has ended, at a checking operation 100. If the coarse-granularity feedback period has not yet ended, the method loops back to operation 88 above, for receiving the next TTI and selecting the next preferred precoding matrix. If the coarse-granularity feedback period has ended, the method loops back to operation 84 above, in which system 20 re-selects a sub-codebook for use in the next coarse-granularity feedback period.

In embodiments that use a multilevel codebook, the number of sub-codebooks in a given level L is denoted M(L). In the example of FIG. 2, $M(L)=2^L$, although any other suitable level sizes can be used. The precoding matrices in the codebook can be defined in any suitable manner. In an example embodiment, the precoding matrices comprise Discrete Fourier Transform (DFT) coefficients. A DFT-based codebook of rank 1 is useful, for example, for highly-correlated BS antennas. This property is addressed, for example, in "Precoding Options for 8Tx Antennas in LTE-A DL," document R1-090388, 3GPP TSG RAN WG1 Meeting, Ljubljana, Slovenia, Jan. 12-16, 2009, which is incorporated herein by reference.

For eight BS transmit antennas, it is possible in principle to use the columns of the 8-by-8 DFT matrix given by:

$$D_8(n,k) = \frac{1}{\sqrt{8}} e^{\left(-j\frac{2\pi k}{8}n\right)}, \quad k = 0 \ldots 7, \quad n = 0 \ldots 7 \qquad \text{Equation 1}$$

as eight codewords (precoding matrices) of a size-8 codebook, wherein k denotes the codeword index and n denotes the codeword element index.

This eight-vector codebook can be viewed as covering the angular coverage area of the BS using eight precoding matrices whose corresponding beam directions are distributed uniformly in azimuth. A finer-resolution, sixteen-vector codebook for example is given by:

$$D_8^2(n,k) = \frac{1}{\sqrt{8}} e^{\left(-j\frac{2\pi k}{2\cdot 8}n\right)}, \quad k = 0 \ldots 15, \quad n = 0 \ldots 7 \qquad \text{Equation 2}$$

The finer-resolution codebook of Equation 2 has twice as many codewords as the codebook of Equation 1, and therefore would require considerably higher feedback bandwidth. Alternatively, the disclosed multilevel codebook configurations enable system 20 to achieve the high precoding resolution of the finer-resolution codebook with little or no increase in feedback bandwidth.

In an example embodiment, the codebook has a multilevel structure as shown in FIG. 2 above. In this example, the precoding resolution of the sub-codebooks increases by a factor of two from one level to the next. The number of sub-codebooks in the $L^{th}$ level is given by:

$$M(L) = \begin{cases} 2^{L+2} & L > 0 \\ 1 & L = 0 \end{cases} \qquad \text{Equation 3}$$

The elements in the multilevel codebook are given by:

$$C_N^{L,k_0}(n,i) = \frac{1}{\sqrt{N}} e^{\left(-j\frac{2\pi}{2\cdot 2^L\cdot 8}n(k_0+i)\right)} \qquad \text{Equation 4}$$

wherein $L=0 \ldots L_{max}$, $k_0=0 \ldots M(L)-1$, $i=0 \ldots 15$ and $n=0 \ldots N-1$. The level index L and the "rotation" ft identify the sub-codebook, I denotes the codeword index, N denotes the number of transmit antennas (and thus the dimension of the codeword), and n denotes the codeword element index. Note that there is overlap between codewords of neighboring sub-codebooks since $M>2^L$.

For N=8, the top-level sub-codebook is given by:

$$C_8^{0,0}(n,i) = D_8^2(n,i) \qquad \text{Equation 5}$$

and BS 24 and UE 28 switch from this sub-codebook as necessary to the various sub-codebooks $C_8^{L,k_0}$. At any given level L, all the codewords belong to a specific set of vectors of length N. This set corresponds to the first N elements of all the columns of a $2^{L+1} \cdot N$-dimensional DFT matrix. The various elements in the various codewords of the various sub-codebooks belong to the alphabet of a DFT of dimension $2^{L_{max}+1} \cdot N$.

The description that follows describes another multilevel DFT-based codebook, in accordance with another example embodiment. This example is used for enhancing a channel feedback scheme that is specified in the LTE release 8 specifications. In LTE release 8, the UE transmits Precoding Matrix Indicator (PMI) feedback either a-periodically on a high-capacity Physical Uplink Shared Channel (PUSCH), or periodically on a low-capacity Physical Uplink Control Channel (PUCCH).

In an embodiment, the precoding resolution of the PUSCH-based feedback is enhanced by increasing the codebook size, for example from four bits to eight bits. The PUCCH-based PMI feedback, however, is typically limited to four bits because of the limited capacity of this channel. Thus, in this embodiment, the precoding resolution of the PUCCH-based PMI feedback is increased using a multilevel codebook.

Consider, for example, a three-level codebook in which the sub-codebook size (in bits) at level L is denoted B(L). In the present example L=0 ... 2 and B(L)=2L+4, i.e., B(0)=4, B(1)=6 and B(2)=8. The L=2, eight-bit sub-codebook comprises the codebook specified for PUSCH feedback in the LTE specification. The other sub-codebooks are defined to have a size of four bits. Switching between sub-codebooks is determined based on the level L and the rotation ft (which identifies the four-bit sub-codebook to which the PMI feedback corresponds).

Since DFT-based codewords can be viewed as related to respective transmission beam angles, all the codewords of a given sub-codebook should typically be contiguous in angular coverage. Therefore, an optimum-granularity choice for the number of sub-codebooks (i.e., the number of values that $k_0$ can take) is the number of rotations that are needed to map all the codewords in level L, which is equal to the number of codewords. Thus, we get:

$$M(L) = 2^{B(L)} \qquad \text{Equation 5}$$

Alternatively, other suitable choices of M can also be used. A finest-granularity choice would typically allow rotation at the angular resolution of the highest-level (i.e., eight-bit) sub-codebook. A coarser-granularity choice may use the rule in Equation 3 above. In other words, any element in the multi-level codebook is given by:

$$C_N^L(n,k) = \frac{1}{\sqrt{N}} e^{\left(-j\frac{2\pi}{M(L)}nk\right)} \qquad \text{Equation 7}$$

wherein k=0 ... M−1 denotes the codeword index, N denotes the number of transmit antennas (and thus the dimension of the codeword), and n=0 ... N−1 denotes the codeword element index.

The $L^{th}$ sub-codebook is further divided into sub-codebooks, and the elements of sub-codebook $k_0$ are given by:

$$C_N^{L,k_0}(n,k) = \frac{1}{\sqrt{N}} e^{\left(-j\frac{2\pi}{M(L)}n(k-k_0)\right)} \qquad \text{Equation 8}$$

wherein k now has a smaller range of values k=0 ... M(0)−1, i.e., sixteen codewords.

Let OS(L) be a DFT over-sampling factor that is defined as the ratio between the sub-codebook size and the DFT dimension N, i.e., OS(L)=M(L)/N. Using this notation, we can write:

$$C_N^{L,k_0}(n,k) = \frac{1}{\sqrt{N}} e^{\left(-j\frac{2\pi}{OS(L)N}n(k-k_0)\right)} \qquad \text{Equation 9}$$

Figure 4:
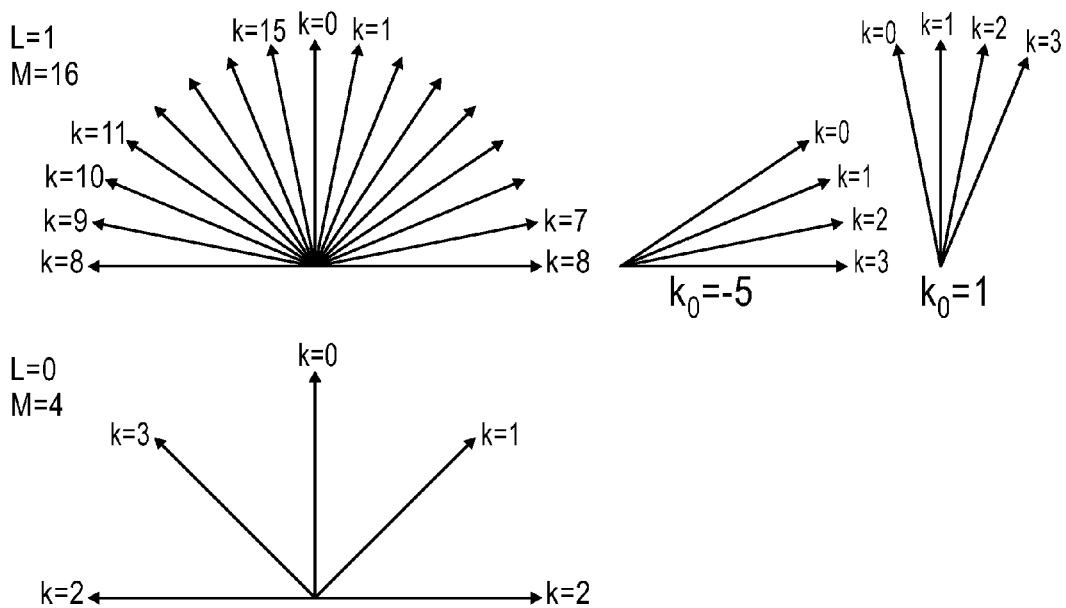
FIGS. 4 and 5 are diagrams that schematically illustrate multi-level codebooks, in accordance with embodiments that are described herein.

FIG. 4 is a diagram that schematically illustrates a multilevel codebook, in accordance with an embodiment that is described herein. The codebook in question is a multilevel, 16-DFT-based multilevel codebook. The codebook has two levels such that B(0)=2 and B(1)=4. FIG. 4 illustrates four example sub-codebooks from this multilevel codebook. Each arrow in the figure represents a codeword, i.e., a precoding matrix. The arrow directions correspond to beam azimuth angles that are achieved by the respective precoding matrices. The azimuth angles in this example correspond to a uniformly-spaced linear antenna array with half-wavelength ($\lambda/2$) spacing between adjacent antennas. In alternative embodiments, any other suitable selection of azimuth angles can be used.

The description above mainly addresses DFT-based codebooks. In these codebooks, all the precoding matrices are Constant Modulus (CM) matrices. Precoding using CM matrices causes the transmit antennas to transmit at equal power levels—sometimes a desirable property. In alternative embodiments, however, system 20 uses codebooks in which the precoding matrices are not necessarily DFT-based, but nevertheless have the CM property. Codebooks that are only partially DFT-based are described, for example, in "Codebook for 8Tx DL SU-MIMO for LTE-A," document R1-094686, 3GPP TSG RAN1 WG1 meeting, Jeju, Korea, Nov. 9-13, 2009, which is incorporated herein by reference.

In an example embodiment, the codewords in the codebook are mapped to the azimuth angle dimension, for example by correlating them with the azimuth-ordered DFT vectors. Once each $k^{th}$ codeword corresponds to the $k^{th}$ DFT-based vector, the elements of the rotated $k_0$ sub-codebook are given by:

$$C_N^{L,k_0}(n,k) = C_N^L(n,k) \cdot e^{\left(j\frac{2\pi}{M(L)}nk_0\right)} \qquad \text{Equation 10}$$

In various embodiments, the optimal sub-codebook for a given feedback period (or any other time interval or frequency range) is selected by the UE, by the BS, or both. In an example embodiment, UE processor 52 conducts an exhaustive search over the sub-codebooks. The UE processor selects the sub-codebook that maximizes a certain performance measure, e.g., a predicted cumulative downlink throughput.

In alternative embodiments, the sub-codebook is selected based on the channel Spatial Covariance Function (SCF). The SCF matrix R is defined as the expected value of the matrix $H^H H$, wherein H denotes the channel matrix. The expectation is typically evaluated over the entire frequency range and over time periods that are long relative to the feedback update period. In one example SCF-based method, the BS or UE computes the strongest eigenvector of the SCF matrix (i.e., the eigenvector having the strongest eigenvalue), and finds the codeword $C_{eig}$ at level $L_{max}$ that is closest in some sense (e.g., Chordal distance or correlation) to this eigenvector. The BS or UE then refines the search to the sub-codebooks that contain codeword $C_{eig}$.

In another example SCF-based technique, the BS or UE computes the ratio between the strongest and second-strongest eigenvalues of the SCF matrix, and selects the sub-codebook based on this ratio. The ratio between the strongest and second-strongest eigenvalues is typically indicative of the spread of the received signal spatial directions over individual frequency and time instances. Thus, when the ratio is close to unity, the BS or UE select a sub-codebook from a high level L, and vice versa. The actual mapping of eigenvalue ratios to codebook levels can be set, for example, by simulation.

In a disclosed embodiment, the BS or UE first determines the desired codebook level using the eigenvalue ratio. Then, the BS or UE selects within this level a codeword $C_{eig}$ that is closest (e.g., according to Chordal distance or correlation) to the strongest eigenvector. Then, the BS or UE chooses the rotation $k_0$ such that codeword $C_{eig}$ is the central codeword in the sub-codebook (e.g., index k=8 in the four-bit sub-codebook example of FIG. 4).

In various embodiments, BS 24 and UE 28 coordinate the sub-codebook selection with one another in various ways. In some embodiments, the UE or BS selects the sub-codebook and signals the parameters of the selected sub-codebook (e.g., the values of L and $k_0$) to the other end. In an example embodiment, the UE packs these parameters in a given number of bits, and transmits the bits using PUCCH and/or PUSCH signaling. The number of bits used for signaling the selected sub-codebook depends on the number of levels (maximal value of L) and the number of sub-codebooks per level M(L). For example, when $L_{max}$=3 and M is given by Equation 3 above, the total number of sub-codebooks is 1+8+16=25, which can be signaled using five bits.

In alternative embodiments, the BS and UE each select the sub-codebook individually based on some feedback parameter that is known at both ends. In an example embodiment, the BS and UE each uses past PMI feedback reports to estimate the channel covariance matrix. Then, the BS and UE each selects the sub-codebook (e.g., selects L and $k_0$) based on the estimated covariance matrix. This technique is carried out without explicit signaling of the sub-codebook selection between the BS and the UE. Example techniques of this sort are addressed in U.S. Provisional Patent Application 61/321,386, filed Apr. 6, 2010, whose disclosure is incorporated herein by reference.

In some practical scenarios, the long-term covariance (which in some embodiments determines the selection of sub-codebook) may undergo abrupt changes. When such an abrupt change occurs, the selected sub-codebook may not be suitable for representing the desired precoding. Consider, for example, a scenario where sub-codebook selection has converged to a low-level (large L) sub-codebook having a small precoding range that covers a small range of azimuth angles. An abrupt change in the angle-of-arrival of the downlink signal may render the currently-selected sub-codebook useless. Recovering from such an event (i.e., selecting a new sub-codebook that matches the new signal angle-of-arrival) may take a long time, regardless of whether explicit or implicit signaling is used.

In some embodiments, the multilevel codebook design mitigates such scenarios by replacing some of the precoding matrices in a given high-level sub-codebook (that covers a narrow precoding range) with a diluted set of precoding matrices taken from the lowest-level (L=0) sub-codebook (that covers a wide precoding range). In other words, the high-level sub-codebook is appended with one or more precoding matrices that give some degree of wide precoding range, at the expense of losing some precoding accuracy within the original precoding range of the sub-codebook.

Figure 5:
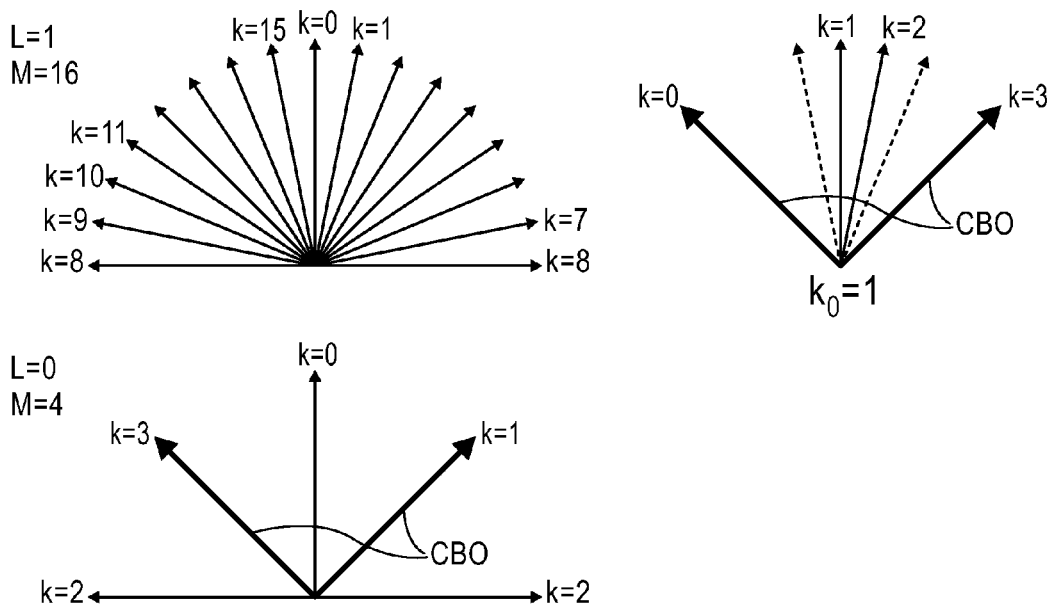

FIG. 5 is a diagram that schematically illustrates a multi-level codebook, in accordance with an embodiment that is described herein. FIG. 5 demonstrates the above-described technique. In the present example, the codebook has two levels (L=0,1). Level L=0 has two-bit sub-codebooks, and level L=1 has four-bit sub-codebooks.

In this embodiment, half of the codewords of level L=0 (e.g., every second codeword) are defined as a fixed eight-codeword sub-codebook denoted CB0. The 4-bit sub-codebook at level L=1 is truncated to eight codewords and combined with CB0. FIG. 5 illustrates this technique for the example codebook of FIG. 4 above, where the truncation of the L=1 sub-codebook retains the central two codewords, i.e., k=1 and k=2. Another possible choice would be to retain every second codeword out of the four, e.g., k=0 and k=3.

In the example of FIG. 5, a one-bit sub-codebook denoted CB0 is marked in the figure. Each of the level L=1 sub-codebooks are modified by replacing the two outer codewords (the precoding matrices having the smallest and largest rotation angles in the sub-codebook) with CB0. Thus, each level L=1 sub-codebook now has some degree of wide coverage.

In an example embodiment, a rank=1 codebook for four transmit antennas (4TX) that is specified in the LTE release 8 specifications is modified using the above technique. The original codebook comprises eight DFT-based codewords (with over-sampling ration of 2) and eight non-DFT codewords. The non-DFT codewords correspond to a diffuse, multimodal antenna pattern. In this embodiment, the eight non-DFT codewords are retained as the fixed CB0. The higher codebook levels are constructed exclusively from DFT-based codewords. Thus, any selected higher level sub-codebook comprises a combination of CB0 and eight high-resolution DFT-based codewords.

The codebook and sub-codebook configurations described herein are example configurations that are depicted solely for the sake of conceptual clarity. In alternative embodiments, any other suitable codebook and sub-codebook configurations can be used.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
holding in a receiver a definition of a codebook comprising precoding matrices and a definition of multiple sub-codebooks comprising different respective subsets of the precoding matrices in the codebook, wherein the sub-codebooks are arranged in multiple levels that progressively increase in precoding resolution and decrease in precoding range;
selecting in coordination with a transmitter a sub-codebook for use in a given time interval or frequency range;

receiving a Multiple-Input Multiple-Output (MIMO) signal that is transmitted from the transmitter; and based on the received MIMO signal, generating in the receiver feedback that is indicative of one or more preferred precoding matrices, which are chosen from the selected sub-codebook and which are to be used in precoding subsequent MIMO signals in respective partitions of the given time interval or frequency range, and transmitting the feedback from the receiver to the transmitter.

2. The method according to claim 1, wherein holding the definition comprises adding to each of the sub-codebooks a diluted set of the precoding matrices having a broadest precoding range.

3. The method according to claim 1, wherein holding the definition comprises defining each sub-codebook to represent a respective angular range of transmission beam directions of the transmitter, and wherein arranging the sub-codebooks in the levels comprises populating the levels with the sub-codebooks that progressively decrease in a size of the angular range.

4. The method according to claim 3, wherein arranging the sub-codebooks in the levels comprises causing respective angular ranges of the sub-codebooks in a given level to partially overlap.

5. The method according to claim 1, wherein selecting the sub-codebook comprises signaling between the transmitter and the receiver a respective level and a respective index within the level of the selected sub-codebook.

6. The method according to claim 1, wherein holding the definition comprises formulating each of at least some of the precoding matrices using a respective set of Discrete Fourier Transform (DFT) coefficients.

7. The method according to claim 1, wherein selecting the sub-codebook comprises deciding on the selected sub-codebook in the receiver and indicating the selected sub-codebook to the transmitter.

8. The method according to claim 1, wherein selecting the sub-codebook comprises receiving a notification of the selected sub-codebook from the transmitter.

9. The method according to claim 1, wherein selecting the sub-codebook comprises evaluating a Spatial Covariance Function (SCF) of a communication channel over which the MIMO signal is received, and selecting the sub-codebook based on the evaluated SCF.

10. The method according to claim 9, wherein evaluating the SCF comprises estimating the SCF independently in each of the transmitter and the receiver, and selecting the sub-codebook independently in each of the transmitter and the receiver based on the independently-evaluated SCF.

11. Apparatus, comprising:
a memory, which is configured to hold a definition of a codebook comprising precoding matrices and a definition of multiple sub-codebooks comprising different respective subsets of the precoding matrices in the codebook, wherein the sub-codebooks are arranged in multiple levels that progressively increase in precoding resolution and decrease in precoding range;

a receiver, which is configured to receive a Multiple-Input Multiple-Output (MIMO) signal that is transmitted from a remote transmitter;

a processor, which is configured to select in coordination with the remote transmitter a sub-codebook for use in a given time or frequency range, and to generate, based on the received MIMO signal, feedback that is indicative of one or more preferred precoding matrices, which are chosen from the selected sub-codebook and which are to be used in precoding subsequent MIMO signals in respective partitions of the given time or frequency range; and a feedback transmitter, which is configured to transmit the feedback to the remote transmitter.

12. The apparatus according to claim 11, wherein, in accordance with the definition, the processor is configured to add to each of the sub-codebooks a diluted set of the precoding matrices having a broadest precoding range.

13. The apparatus according to claim 11, wherein, in accordance with the definition, the processor is configured to define each sub-codebook to represent a respective angular range of transmission beam directions of the transmitter, and to populate the levels with the sub-codebooks that progressively decrease in a size of the angular range.

14. The apparatus according to claim 11, wherein the processor is configured to decide on the selected sub-codebook, and to indicate the selected sub-codebook to the remote transmitter.

15. The apparatus according to claim 11, wherein the processor is configured to receive a notification of the selected sub-codebook from the remote transmitter.

16. A mobile communication terminal comprising the apparatus of claim 11.

17. A chipset for processing signals in a mobile communication terminal, comprising the apparatus of claim 11.

18. A method, comprising:
holding in a receiver a definition of a codebook comprising precoding matrices and a definition of multiple sub-codebooks comprising different respective subsets of the precoding matrices in the codebook, wherein the sub-codebooks are arranged in multiple levels that progressively increase in precoding resolution and decrease in precoding range;

selecting in coordination with a transmitter a sub-codebook for use in a given time or frequency range;

receiving a Multiple-Input Multiple-Output (MIMO) signal that is transmitted from the transmitter; and based on the received MIMO signal, choosing from the selected sub-codebook a preferred precoding matrix for use in precoding subsequent MIMO signals in the given time or frequency range, and sending an indication of the preferred precoding matrix from the receiver to the transmitter.

* * * * *